United States Patent [19]

Buschor et al.

[11] 4,292,787
[45] Oct. 6, 1981

[54] PAPERBOARD CARTON

[75] Inventors: Josef J. Buschor, Los Gatos; Frederick R. Jennings, Cupertino, both of Calif.

[73] Assignee: Pneumatic Scale Corporation, Quincy, Mass.

[21] Appl. No.: 100,092

[22] Filed: Dec. 4, 1979

Related U.S. Application Data

[63] Continuation-in-part of Ser. No. 911,990, Jun. 2, 1978, abandoned, which is a continuation-in-part of Ser. No. 822,500, Aug. 8, 1977, abandoned.

[51] Int. Cl.$^3$ .................. B65B 3/02; B65B 7/20; B31B 49/02
[52] U.S. Cl. ........................ 53/456; 53/467; 53/477; 53/491
[58] Field of Search ........... 53/452, 456, 467, 471, 53/477, 478, 486, 488, 491; 156/69, 73.1, 580.1, 580.2

[56] References Cited

U.S. PATENT DOCUMENTS

| | | | |
|---|---|---|---|
| 2,357,837 | 9/1944 | Magill | 53/488 X |
| 2,435,397 | 2/1948 | Lang | 53/491 X |
| 2,555,315 | 6/1951 | Carroll | 156/69 X |
| 2,663,981 | 12/1953 | Sanford | 53/472 X |
| 2,758,432 | 8/1956 | Moore | 53/477 X |
| 2,887,933 | 5/1959 | Bergstein et al. | 53/491 X |
| 2,891,453 | 6/1959 | Bergstein et al. | 53/491 X |
| 3,060,652 | 10/1962 | Eckman | 53/478 |
| 3,077,709 | 2/1963 | Kauffeld | 53/491 |
| 3,163,973 | 1/1965 | St. Clair | 53/478 X |
| 3,259,297 | 7/1966 | Kalajian | |
| 3,687,352 | 8/1972 | Kalajian | 229/7 R |
| 3,749,300 | 7/1973 | Jones | 229/37 R |
| 3,775,943 | 12/1973 | Jones | 53/282 |
| 3,800,677 | 4/1974 | Jones | 93/36 DA |
| 3,815,484 | 6/1974 | Jones | 93/49 M |
| 3,912,576 | 10/1975 | Braun | 156/580.2 |
| 3,956,975 | 5/1976 | Egleston et al. | 53/375 X |
| 4,011,984 | 3/1977 | Matovich | 229/37 R |
| 4,037,370 | 7/1977 | Williams | 53/375 |
| 4,072,089 | 2/1978 | Bosche | 156/580.1 |
| 4,084,489 | 4/1978 | Matovich, Jr. | 93/36.8 |

Primary Examiner—Horace M. Culver
Attorney, Agent, or Firm—Knobbe, Martens, Olson, Hubbard & Bear

[57] ABSTRACT

A one-piece blank forms a liquid-tight carton having plural rectangular side walls sealed or integral with one another at adjoining side edges and flat end panels of polygonal shape, the carton facilitating ultrasonic sealing of the end walls to the sidewalls through a unique set of sealing tabs on the side and end walls. The process and equipment for sealing the end walls to the side walls permits ultrasonic heating and sealing after the carton is full of liquid through a compression of the sealing tabs of these walls between facing dies which are diagonally aligned in relationship to the side and end walls. The carton formed by this blank facilitates nesting of multiple cartons, one above the other.

13 Claims, 12 Drawing Figures

PAPERBOARD CARTON

RELATED CASE

This application is a continuation-in-part of co-pending application Ser. No. 911,990, filed on June 2, 1978 and now abandoned which is a continuation-in-part of application Ser. No. 822,500, filed on Aug. 8, 1977 and now abandoned.

BACKGROUND OF THE INVENTION

The prior art includes one-piece, T-shaped blanks for forming cartons to hold liquids, such as beverages. One such prior art patent application was filed by Mitchell J. Matovich, Jr., on Nov. 5, 1976 and bears U.S. Pat. No. 4,084,489. The T-shape in such prior blanks results from the provision of end closure panels at the opposite ends of one of the side wall panels of the carton. Each of the remaining side wall panels is provided at its ends with sealing tabs to be bent inwardly after the blank has been folded into the configuration of an open ended tube, and side seamed by means of a side seam flap carried by the same side wall panel with which the two end closure panels are associated. The free edges of the end closure panels are designed to be sealed to the sealing tabs on the ends of the side wall panels and, in the cited prior application as well as most prior art used to form flat-ended cartons, the edges of the end closure panels, or at least the last of the end closure panels to be closed, and the sealing flaps on the side wall panels adjacent that end, are first heated to render the polyethylene or other material sealing the carton in a semi-molten condition. After such heating, the end closure panel is pressed onto the top of the previously formed carton side walls to close and seal the carton over its contained liquid.

The prior art also recognizes the fact that there are substantial advantages to utilizing ultrasonic energy as a means of heating and sealing cartons. Unfortunately, ultrasonic heating requires that the pair of carton edges being sealed to one another be placed under pressure between an ultrasonic horn and an anvil, these two members pressing toward one another during the application of ultrasonic energy.

Ultrasonic sealing involves the vibration of an ultrasonic horn relative to a stationary anvil which must be heavy enough to remain stationary inspite of the vibration of the ultrasonic horn against it. The marginal edges of the paper carton which are placed between the ultrasonic horn and the anvil are heated in the regions where they are hammered between the horn and the anvil. The heating of these edges is dependent upon the pressure applied by the rapid hammering of the ultrasonic horn against the paperboard carton lying on the anvil. If the anvil is too light in weight, the anvil will vibrate with the ultrasonic horn, and very little relative motion will occur between the ultrasonic horn and the anvil. Therefore, very little heat will be induced in the paperboard carton. Furthermore, the anvil must provide a continuous area of support for the marginal edges beneath the ultrasonic horn in order for a continuous seal to be effected. In areas where the support provided by the anvil to the marginal edges is discontinuous, no heating will occur in the marginal edges, and therefore no seal will result in those areas. A further requirement for effecting a continuous seal is that the paperboard carton itself be continuous in the regions where a seal is to be effected. Thus, gaps or tears in the marginal edges will interrupt the formation of heat during the pounding of these edges between the ultrasonic horn and the anvil.

When sealing the side walls of a previously beverage-filled carton to the top end closure panel, it is impossible to place a sealing anvil inside of the container. Thus, no adequate means has been discovered to permit sealing such a carton utilizing ultrasonic energy.

It is believed to be known to form the upper carton end (after beverage filling) into a gable roof which permits a single gable roof seam to be sealed ultrasonically while being pinched between an ultrasonic horn and anvil, each of which lies in a plane which is perpendicular to a plane defining the flat upper end of the carton. While such gable roofed cartons operate satisfactorily, they do not facilitate stacking on top of one another in a larger carton, as is desirable when the beverage cartons are relatively small (as with one-half and one-third quart mile cartons). In addition, the formation of the gable top on these cartons requires a substantial increase in the amount of carton material required for the beverage container since typically the entire gable top is void of beverage and is simply extra paper stock material folded to provide the gable roof.

SUMMARY OF THE INVENTION

The carton blank which is the subject of the present invention, as well as the method utilized for forming the blank into the carton, are all specifically adapted to facilitate ultrasonic sealing of marginal edges of the carton upper end closure panel to the upper edges of the carton side walls after the carton has been filled with a beverage.

The paperboard carton has the novel feature of a continuously unbroken sealing edge or tab extending around the perimeter of the carton, which is unbroken even in the vicinity of the corners between adjacent side panels. This invention also provides for an anvil which is sufficiently heavy to provide the required static support to the paperboard carton during ultrasonic heating while at the same time providing a small lip which supports the sealing tab of the carton continuously around the adjacent side panels of the carton while the carton may be filled with liquid. The sealing lip is prevented from yielding to the ultrasonic vibrations of the ultrasonic horn by reason of its small extension from the body of the anvil. The extension of the lip on the anvil is therefore made at an approximately 45-degree angle, since this structural shape minimizes the inducement of vibrations in the lip by the ultrasonic horn. For this reason, the lip of the anvil merely indents the sealing tab a short distance below the top of the side panel. In order to prevent tearing or breaking of the sealing tab of the carton in the region of the corners between adjacent side panels of the carton, the lip of the anvil is formed with a gradual radius in the corresponding corners formed in the anvil. The sealing tab is folded to form a double thickness wall portion, which also serves to prevent tearing in the vicinity of the corners. The small size of the indentation of the tab effected by the sealing lip of the anvil also serves to minimize the strain in the vicinity of the corners of the sealing tab and thereby prevent tearing.

Thus, the invention provides an ultrasonically sealed, flat top beverage container which facilitates nesting of one container above another during shipment. This is accomplished by forming the sealing tabs at the ends of adjacent side wall panels integral with one another, rather than separated from one another by a V-shaped cut as was common in the prior art. In effect, the sealing tabs of this invention are connected by corner webs. These sealing tabs thus run continuously around three sides of the carton once it has been formed into an open ended tube. The tabs are bent inwardly to form, in effect, a double thickness wall portion at the upper perimeter of the side wall panels.

After filling the carton with liquid, the double thickness, upper wall portion formed by the sealing tabs and the side wall panels, together with the perimeter edge of the top end closure panel, are press formed between adjacent die faces, the faces lying in a plane inclined at an angle of approximately 45 degrees with respect to the plane of both the upper end closure panel and the side wall panel being sealed. This pressing operation stretches the webs which interconnect the sealing tabs. In order to assure that this stretching does not rupture the webs interconnecting the sealing tabs at the carton corners, the carton is indented by the sealing die at a location immediately below the seal, so that the outermost position reached by the sealing tabs and their interconnecting webs is insufficient to cause tearing. The double thickness at the sealed corner also assists in prohibiting rupture at this location.

After the die has been used to form the adjacent sealing edges in the manner described above, an ultrasonic horn is placed against the perimeter edges, the contacting end of the horn also defining a 45 degree angle plane relative the side wall and end closure panel of the carton. Application of ultrasonic energy to the perimeter margin then seals the upper end closure to the side wall panels.

After filling and sealing, as previously described, the carton forms a flat topped, polygonal structure which is adapted to nesting, one above the other, during shipment.

These and other advantages of the present invention are best understood through the following detailed description of the preferred embodiment which references the drawings, in which:

DETAILED DESCRIPTION OF THE PREFERRED EMBODIMENT

Figures 1, 2:
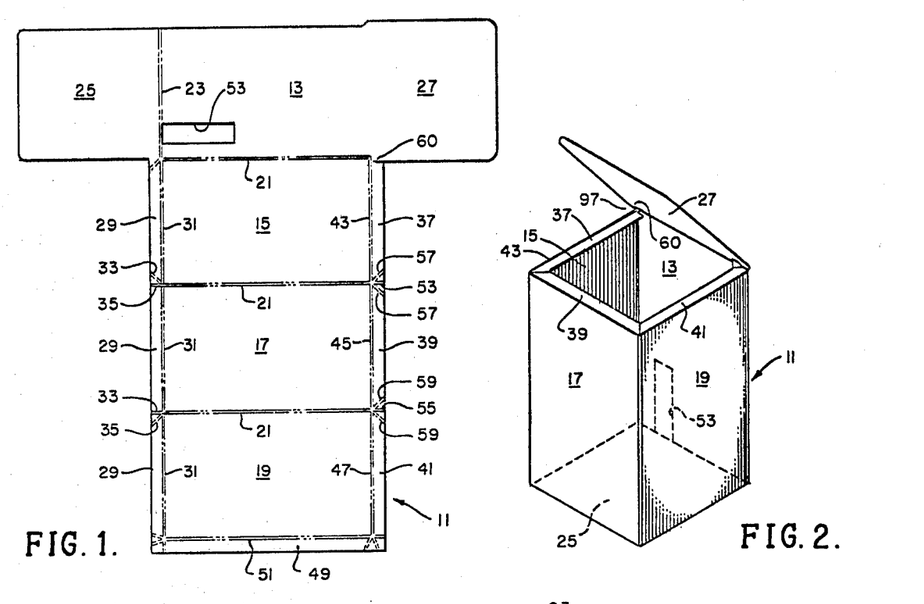
FIG. 1 is a plan view of the carton blank used to form the carton of the present invention.
FIG. 2 is a perspective view showing the carton of the present invention partially formed from the blank of FIG. 1, but prior to closure of the upper end closure panel onto the side walls.

Referring initially to FIG. 1, the reference numeral 11 designates a polyethylene coated paperboard blank of T-shaped configuration from which a complete carton, sealed to be liquid tight, may be derived without requiring any other carton components. The blank is comprised of four carton side wall panels 13, 15, 17, and 19, separated or delineated by indentation lines or scorings 21 along which folding of the blank into carton configuration may take place.

The wall panel 13 has integral therewith and delineated by indentation line or scoring 23, a lower carton end closure panel 25 which, in this particular instance, is square because the four side wall panels 13 through 19 are shown as being of equal width. If two side wall panels are to be of different widths than the other two, in alternation among the four, the resulting carton would be a rectangular cross section and not square and the end panel 25 would accordingly be rectangular and not square. If there were only three side wall panels instead of four, the end panel 25 would, of course, be triangular.

At the remaining end of the side wall panel 13, a top end closure panel 27 extends (without an indentation or scoring for delineation) from the side wall 13. The upper end wall 27 is wider than the lower end closure 25 or side wall 13 and, in addition, extends further from the side wall 13 than does the bottom end closure 25. The length and width of the end wall 27 is thus greater than the width of any of the panels 13–19. This increased size is required for overlapping sealing with the side wall panels 15–19 as will be understood as this description continues.

The side wall panels 15, 17 and 19 each have, at their lower ends, sealing flaps or tabs 29 delineated by indentation or scoring lines 31 and separated from one another by a pair of indentation or scoring lines 33,35. The upper end of each of the panels 15, 17, and 19 is also provided with sealing flaps or tabs 37, 39 and 41, respectively, delineated by indentation or scoring lines 43, 45, and 47, respectively.

The prior art would suggest a separation of the tabs 37,39,41, one from another. In this case, however, they are connected by webs 53 and 55 of material. It has been found that these score lines 57 and 59 defining the webs preferably extend all the way to the score lines 43–47, but could stop somewhat short of those score lines so that the apexes of the triangular webs 53 and 55 are spaced slightly from the score lines 43–47.

Along its free edge, the side wall panel 19 is provided with a sealing tab 49 delineated by the indentation or scoring line 51.

Finally, in the case of a carton particularly adapted to hold potable liquids and provided internally with a sipper, as taught by Kalajian Pat. No. 3,259,297, granted July 5, 1966, one of the side wall panels, for example the side wall panel 13, may be provided with a rectangular opening 153 adjacent to one end of the panel and extending parallel to the long dimension of the side wall 13. The opening is produced by cutting through the side wall panel to produce either a flap connected at one end or a complete opening, either of which will support a sipper which is mounted in a manner which permits its rotation about one end of the opening 153 so that it may be extended from the carton during use.

Whereas with prior designs the ends of the sealing flaps 37 through 41 were often cut away at an angle, the sealing flaps 37–41 of the blank 11, as indicated above, remain connected to one another by V-shaped web sections 53 and 55. Each of the scoring lines 57,59 is at an angle of approximately 45 degrees with respect to the adjacent scoring lines 21, 43, 45, and 47. Scoring lines 57 and 59 typically intersect the scoring lines 21 at the scoring lines 43,45,47 to facilitate a right angle bend between the side panels 15,17,19.

Figures 3, 4, 5:
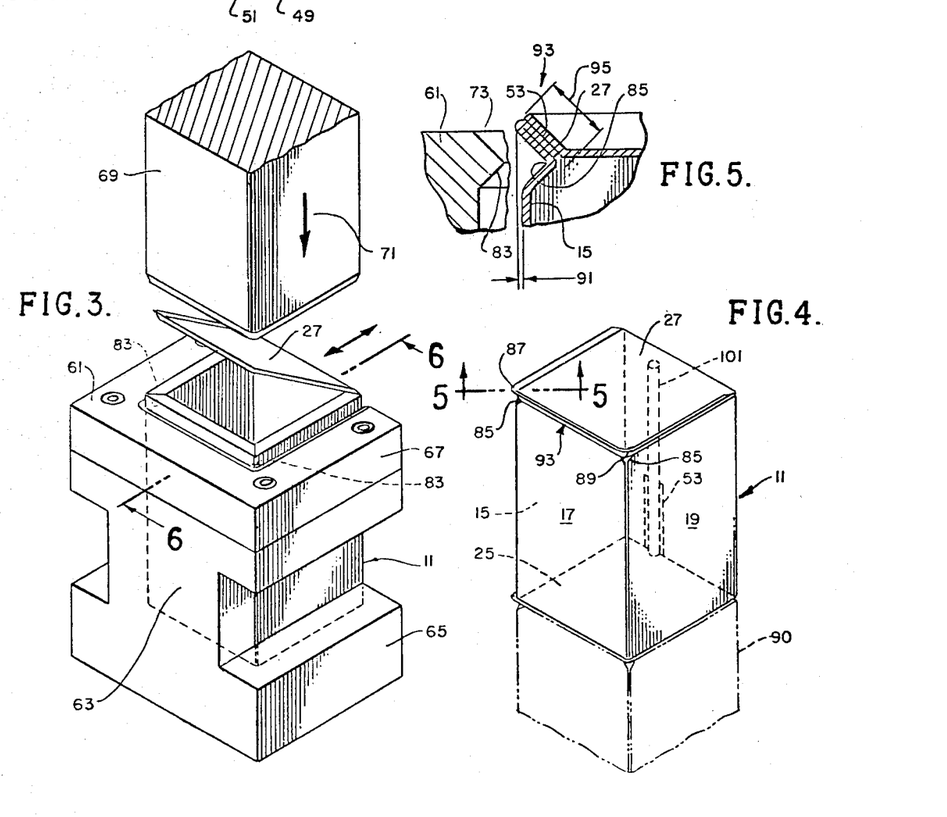
FIG. 3 is a schematic, perspective view showing the partially formed carton of FIG. 2 located within a schematically illustrated anvil and showing, in addition, the die used to compress the carton perimeter edges against the anvil.
FIG. 4 is a perspective view of the carton formed by the apparatus and process of FIG. 3 after perimeter edge sealing.
FIG. 5 is an enlarged sectional view taken along lines 5—5 of FIG. 4 and showing the configuration of the carton end closure and side walls at the intersection of two such side walls.

The carton is shown in a partially formed condition in FIG. 3, a number of steps having been accomplished to bring the carton to this stage of completion. The first step is to bend or flex the several wall panels at their scoring lines 21 to bring them around into the form of an open-ended tube, with the sealing tab 49 on the side wall panel 19 inside and overlapping the edge of the side wall panel 13. It is contemplated that the blank 11 will be formed of a paper stock coated with polyethylene to render it impervious to liquids and the formation of the blank into an open ended tube is accomplished by placing a mandrel inside of the open ended tube and against the sealing tab 49, with ultrasonic energy being applied to the exterior surface of the panel 13 where it overlaps the tab 49. The ultrasonic energy partially melts the polyethylene on the two surfaces while the surfaces are held in contact with one another under pressure till the polyethylene fuses to effect a seal between these two surfaces.

After the formation of this open ended tube, the bottom panel 25 can be sealed to the tabs 29 to close the bottom of the tube. This is generally accomplished by first folding the tabs 29 toward the interior of the open-ended tube formed by the side walls 13 through 19, the score lines 33, 35 forming overlapping corner sections during this folding. The end 25 is then folded against the bottom of the open-ended tube and, in particular, into an overlapping relationship with the tabs 29. A mandrel is then placed on the inside or outside of the tube and against the overlapping portion of the end closure 25 and end tabs 29 and, on the opposite side, an ultrasonic horn is placed against the same overlapping members. Ultrasonic energy is then applied to seal the polyethylene on the confronting sections. It will be seen from the previous description that, in the case of the formation of the tube as well as the closure of the bottom, it is possible, because there is no liquid within the tube, and because a portion of the tube remains open for access, to place a mandrel or anvil within the tube so that a confronting relationship between such a mandrel and an ultrasonic horn can be accomplished, with the parts to be sealed pinched between these confronting members.

It is, of course, the object of the present invention to allow ultrasonic sealing of the open upper end of the tube shown in FIG. 2 at a time when liquid fills the carton, so that a mandrel or ultrasonic horn cannot be placed inside of the carton.

This sealing method for the upper closure end 27 is shown in FIG. 3. In order to aid in closing the carton, preferably the upper lid 27 may be folded to a closed position and released, prior to the condition of the carton shown in FIGS. 2 and 3, in what can be considered to be a limbering operation. Polyethylene coated paperboard tends to have a memory so that, when relieved of the flexing pressure, the closure end 27 tends to self-restore a part of the distance toward its original position lying in a plane parallel to the plane of the side 13. The position of the closure end 27 in FIGS. 2 and 3 is a reasonable representation of the attitude of this closure end 27 after the limbering operation and prior to being pressed down and sealed. In addition, the lid has been preformed to have its marginal portions at all three non-hinged edges extend up at about a 45-degree angle.

Figure 3A:
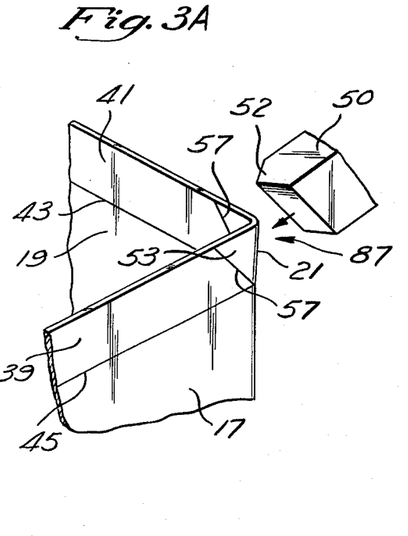
FIG. 3A is an enlarged partial perspective view of one of the forward corners of the partially formed carton of FIG. 2 aligned with a schematically represented creasing pin utilized to fold the forward corner inward to reside within the interior of the carton.

A limbering or preform operation is additionally completed on the sealing tabs 37, 39, and 41 to cause the top end of the carton 11 to be formed in a proper condition for the subsequent end sealing process. The sequence of discrete folding step accomplished during this preform operation of the sealing tabs 37, 39, and 41 is depicted in FIGS. 3A, 3B, and 3C.

Figure 3B:
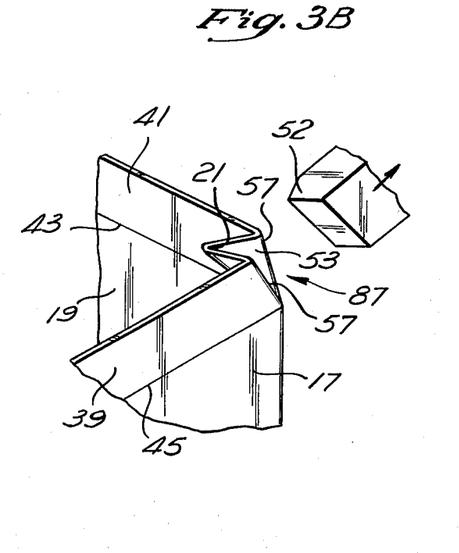
FIG. 3B is an enlarged partial perspective view of the forward corner to FIG. 3A folded inward within the interior of the carton.
Figure 3C:
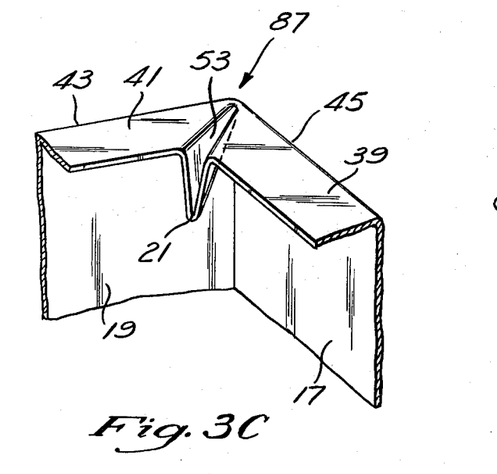
FIG. 3C is an enlarged partial perspective view of the forward corners of FIGS. 3A and 3B showing the manner in which the continuous unbroken perimeter sealing edge of the present invention is formed.

Basically, by this preform operation, the two forward corners 87 and 89 of the open end of the carton 11 located furthest from the top end closure panel 27, are stress-relieved by being dimpled and pushed within the interior of the carton 11 (shown in FIG. 3B). Additionally, the sealing tabs 37, 39, and 41 are bent or folded downward within the interior of the carton to be disposed in a plane generally normal to the top end closure panel 27 (shown in FIG. 3C).

The first step in the preform operation is shown in FIG. 3A wherein the two forward corners 87 and 89 of the carton 11 are aligned with a pair of creasing pins 50 having a "V"-shaped end section 52. (For purposes of illustration only one of the creasing pins 50 and one of the forward corners 87 are shown). The creasing pins 50 are each oriented diagonally with a respective forward corner 87 and 89 of the carton 11 and angularly disposed in a downward inclination such that the pins 50 are directed toward the interior of the carton 11. The pins 50 are additionally provided with suitable operator means (not shown) to reciprocate the pins 50 in the direction of the arrow in FIG. 3A.

With the carton 11 aligned with the pins 50, the operator means (not shown) may be actuated, causing the pins 50 to travel in the direction of the arrow in FIG. 3A thereby contacting a respective forward corner 87 and 89 of the carton 11. During this contact the apex of the "V"-shaped end 52 of the pins 50 contact the respective score lines 21 and 23 formed on the webs 53 and 55, respectively, causing the webs 53 and 55 to be pushed inwardly within the interior of the carton as well as in a slight downward direction. Due to the diagonal scoring line pairs 57 and 59 being formed on the sealing tabs 37, 39, and 41, the paperboard material of the sealing tabs is weakened about the diagonal line pairs 57 and 59 to yield preferential folding lines. As such, the forward corners 87 and 89 consistently collapse into the V-shaped orientation shown in FIG. 3B. By such a "V"- shaped dimpling process, any stresses formed in the forward corners 87 and 89 during the previous folding operations on the carton 11 are relieved and the forward corners form a generally miter-like corner configuration.

Subsequently, the sealing tabs 37, 39, and 41 may be folded inwardly and downwardly about their respective scoring lines 43, 45, and 47, to extend within the interior of the carton 11. Typically the sealing tabs 37, 39, and 41 are folded through an angle substantially greater than 90° to compensate for the slight memory properties of the paperboard material. When released from this extended angular position, the sealing tabs 37, 39, and 41 will return partially upward toward the open end of the carton, but will not return to a location which would make them coplanar with the side wall panels 15, 17, and 19. Rather, they remain folded in a plane generally normal to the plane of the side panels 15, 17, and 19 of the carton 11, as shown in FIG. 3C.

Referring again briefly to FIG. 1, it should be noted that, in order to fold the upper end closure panel 27 and the sealing tab 37 extending from the side panel 15 in separate directions, it is necessary to cut these members apart from one another, as shown by the cut line 60. As will be fully understood through the description which follows, the cut line 60 extends only part-way from the free edge of the sealing tab 37 toward the score line 43, but does not intersect the score line 43, so that a small link or web of continuous, uncut material remains between the tab 37 and the end closure panel 27.

As may be recognized, by this preform procedure of the sealing tabs 37, 39, and 41, the sealing tabs form a continuous unbroken sealing edge or tab extending about the perimeter of the carton 11, which is unbroken (e.e., uncut) even in the vicinity of the forward corners 87 and 89 of the carton, due to the miter-like configuration of the webs 53 and 55 and in the rear corners of the carton 11 due to the small link or web of uncut material remaining between the tab 37 and the end closure panel 27.

Referring now to FIG. 3, the carton, filled with liquid in its partially completed condition as shown in FIG. 2, is placed in a three-sided anvil 61 constructed to conform with the outside surfaces of the container and to abut the side panels 15, 17, and 19. Accordingly, the anvil 61 is shown to include a back frame 63 interconnecting a lower U-shaped section 65 and an upper U-shaped section 67. As previously stated, at the time that the carton is placed into the anvil 61, it has been previously filled with fluid and the upper end closure 27 has been partially closed. An upper die 69, having lower edges conforming with the upper edges of the anvil 61, is lowered, as shown by the arrow 71, onto the anvil 61 to compress the upper closure end 27 against the sides 13-19 of the container. This closure operation is best understood by reference to FIG. 6.

Figure 6:
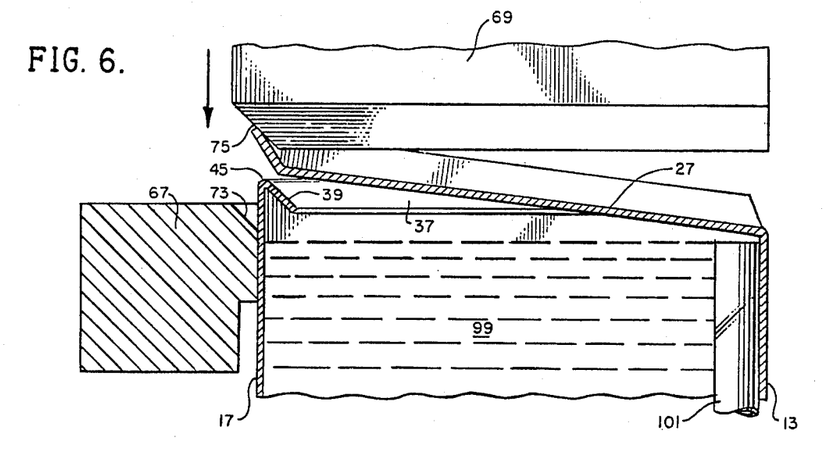
FIG. 6 is an enlarged sectional view taken along lines 6—6 of FIG. 3 showing the interrelationship of the partially formed carton of FIG. 2, the anvil and the die as the upper carton end is sealed.

As shown in FIG. 6, the side wall 17 (and each of the other side walls in a similar manner) is placed in abutting relationship with the upper U-shaped section 67 of the anvil 61. The bend formed at the score line 45 between the side panel 17 and sealing tab 37 is positioned above a diagonally beveled upper edge 73 of the anvil 61. The upper die 69 includes a beveled edge 75 conforming with the beveled edge 73, and this edge 75, when the die 69 is lowered and pressed onto the anvil 67, forces both the perimeter edge of the upper closure end 27, the sealing tab 39 and upper perimeter portion of the side panel 17 into abutting relationship. This relationship is shown in FIG. 7, the die 69 fully lowered onto and pressing against the anvil 67 and squeezing the three layers of material 39,27,17 which form the sealing interface at the upper perimeter of the carton.

Figure 3D:
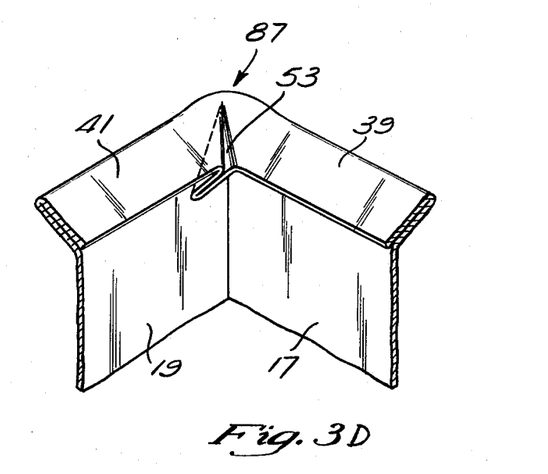
FIG. 3D is an enlarged partial perspective view of the continuous unbroken perimeter sealing edge of FIG. 3C folded outward to extend diagonally outboard of the vertical planes of the side walls of the carton of the present invention.

The particular configuration of the sealing tabs 37, 39, and 41 and upper perimeter portion of the carton 11, formed by this lowering of the die 69, is depicted in FIG. 3D. For purposes of illustration, the end closure 27 has been removed in FIG. 3D. As shown, the sealing tabs 37, 39, and 41, as well as the upper perimeter portion of the side walls 15, 17, and 19, are beveled outward to extend laterally slightly beyond the vertical planes of the side walls 15, 17, and 19. This lateral extension thereby permits the carton blank to be rigidly supported by means of the exteriorly positioned V-shaped anvil 67.

Additionally, by the lowering of the die 69, the frontal corners 87 and 89 of the carton 11 are extended a short distance laterally outward forming an inclined, smooth corner transition between the adjoining sealing tabs 37, 39, and 41. This extension is facilitated by the stretching or thinning flow of the paperboard stock in the outermost portion of the corners 87 and 89 which causes the miter-like interfaces of the adjacent sealing tabs 37, 39, and 41 to be spaced inwardly from the outermost edge of the forward corners 87 and 89. This inward spacing (represented by the reference numeral d in FIG. 3D), ensures that the groove 61 formed between corner webs 53 and 55 at the miter-like interface terminates at a location along the length of the continuous sealing tabs 37, 39, and 41 thereby being capable of being positively sealed or closed off by the corresponding corner portions of the end closure panel 27 during the subsequent sealing process.

Figure 7:
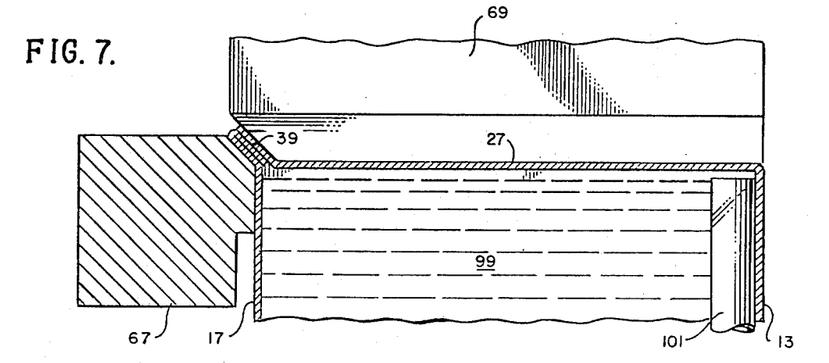
FIG. 7 is a sectional view similar to that of FIG. 6 showing the die fully in place on the anvil.

After the die 69 has been lowered into a squeezing relationship, as shown in FIG. 7, it is removed, and an ultrasonic horn 77, having a beveled edge 79 identical to the beveled edge 75, is lowered into place on the anvil 67. Ultrasonic energy is applied by the horn 77 to the three layers of material 39,27,17 to heat the three layers and seal the polyethylene coating thereon to form a sealed corner edge.

Figure 8:
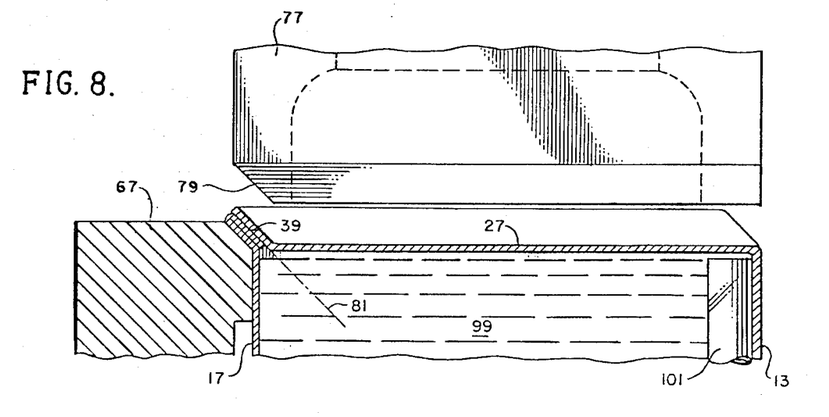
FIG. 8 is a sectional view similar to that of FIGS. 6 and 7 showing the ultrasonic horn replacing the die above the anvil for the final sealing step of the method used for forming the carton of the present invention.

The three layers of material sealed at the edge lie substantially in a plane designated in FIG. 8 by numeral 81. This plane is inclined at an angle of approximately 45 degrees with respect to both the upper end closure 27 and the side wall 17.

It should be noted that, while FIG. 3 shows the die 69 moving straight down onto the anvil 67 (as shown by the arrow 71), the fact that the die 69 only abuts the anvil 61 on three sides may require that the force applied to the die also have a horizontal component from right to left in FIG. 7 as there is no pressure applied by the die at the hinged edge. In practice it is found that the resulting force on the die in FIG. 7 should be diagonally down and left. It may be preferably for the die 69 to reciprocate in a diagonal direction down and to the left in FIG. 7 at an appropriate angle, to equalize the forces between these members. It should also be recognized that the remaining two sealing tabs 37 and 41 on carton sides 15 and 19 are sealed in a manner substantially identical to the sealing shown in FIG. 6–8 of sealing tab 39 and side 17, three sides of the carton being sealed in this manner. Each of these sealed sides facilitates, through the use of a 45 degree angle bend of the sealed portions, the squeezing of the sealed members between the anvil 61 and ultrasonic horn 77.

Referring now to FIG. 5, the effect of this sealing method on the carton corner will be examined. It will be noted through an examination of FIG. 4 that the sealed portion of the carton side walls 15-19 extends outwardly beyond the plane of the side walls 15-19. This creates a problem of stretching of the material at the webs 53 and 55 of the forward corners 87 and 89 of the carton 11 as well as a stretching of the material in the area of the score lines 43, 45, and 47 (FIG. 1), adjacent the webs 53 and 55, since the perimeter dimension is increased. This stretching has a tendency to rupture or tear the material at the corners. This tendency is reduced by a large radius corner bead 83 shown protruding from the corner of the anvil 61 at the lower extremity of the beveled edge 73. This protruding corner bead 83 is reproduced identically in each of the two corners of the anvil 61 and produces in the two forward corners 87 and 89 of the carton 11 (FIG. 4) an indentation 85 just below the sealing lip. As shown in FIG. 5, this indentation 85 reduces to a negligible size, or even zero, the dimension 91 by which the sealed lip 93 of the carton must extend beyond the side wall 15 of the carton for a predetermined length 95 of sealed lip 93. The corner bead 83 also provides a larger radius bend at each of the carton corners 87,89, which greatly facilitates the use of ultrasonic energy for sealing.

The extension 91 of lip 93 beyond the wall 15 determines the extent to which the corners 87 and 89 (FIG. 4) of the carton are stretched during the sealing process. As can be seen from FIG. 4, the upper end closure 27 of the carton 11 is compressed during the sealing operation, whereas the side wall portions 15, 17, and 19 are each expanded at the sealed corners 87 and 89. If this expansion is sufficient, it will rupture the corners at the seal (at webs 53,55) and cause a leak in the container. The indentation 85 permits a wide sealing lip 93 with an enlarged radius at its corners, as depicted in FIG. 3D, while limiting or eliminating this extension 91. Additionally, due to the groove 61 formed between the corner webs 53 and 55 terminating at a distance spaced from the outermost edge of the forward corners 87 and 89, the perimeter edges of the top end closure 27 may be positively seated and sealed along the continuous unbroken sealing tab surfaces 37, 39, and 41 even in the vicinity of the corners 87 and 89 with the corner portions of the end panel 27 mating with the unbroken corner portions of the sealing tabs defined by the distance d shown in FIG. 3D. Futher, it will be recognized that with the perimeter of the end closure 27 seated and sealed along the unbroken sealing tabs 37, 39, and 41, the outermost ends of the grooves 61 formed at the miter-like interfaces are positively "closed off" thereby eliminating any tendency for leakage in the forward corners.

As is best seen in FIG. 2, the corner 97 formed between the sides 13 and 15 must also seal with the end closure 27, and this seal is most difficult at the cut line 60 formed in the carton blank between the end tab 37 and the end closure 27. By making this cut line 60 end short of the short line 43 (FIG. 1), at which the sealing tab 37 is bent, it is possible to leave a short web of material between the end closure 27 and tab 37 extending toward the center of the carton against which the end closure 27 can be sealed in order to prevent any leaks at this corner.

As is best seen in FIG. 4, the sealing lip 93 extending around three sides of the upper perimeter of the carton 11 at a 45-degree angle from the plane of the upper closure end 27 facilitates nesting of the bottom of one carton 11 within the perimeter of the top of a lower carton 90, when the cartons 11 and 90 are to be transported, as in a larger receptacle, stacked one on top of the other.

Throughout the description of this invention it has been assumed that the carton, prior to being placed in the anvil 61, had been filled with a liquid 99 and that a sipper 101 had been attached and sealed within the opening 53, as shown in FIG. 4, so that the carton 11 is closed except for the upper closure end 27, and filled.

While this embodiment is described as using a mandrel to form the carton sealing arrangement prior to use of a horn, alternatively the ultrasonic horn can perform both functions in a single step; especially if the horn is mounted for diagonal movement as discussed above.

The foregoing features will now be related specifically to the requirements of ultrasonically sealing the paperboard cartons. Referring first to FIG. 5, the anvil 61, shown in cross-section, has its lip 73 extending out at approximately a 45 degree angle instead of straight out. In FIG. 3, the lip 73 is shown to be continuous and unbroken in its support of the paperboard carton sealing tab comprising the continuous unbroken sections 41, 39, and 37. FIG. 3 and FIG. 4 clearly show that the continuous lip 73 of the anvil 61 extends away from the body of the anvil 61 a very short distance so that the sealing tabs have a very small indentation 85 formed as a result of the pressing of the lip against the side panel, as illustrated in FIG. 5. If, on the other hand, the lip 73, as illustrated in FIG. 5, were to extend away from the body 61 of the anvil at right angles and for a substantial distance, such a lip would be more susceptible of vibrating with the ultrasonic horn 69, instead of remaining static, such that very little heat would be imparted to the sealing tab placed between the horn 69 and the anvil 61. Also, the larger indentation effected by such a lip would be more likely to cause a tear in the corner 83 of the sealing tab. Thus, the lip 73 is defined, as shown in FIG. 5, to extend a short distance at approximately a 45 degree angle. In order to avoid forming a tear between adjacent sealing tabs 37, 39, 41, the anvil is provided with a gradual radius on its lip in the vicinity of the corners between adjacent sealing tabs, as illustrated at 83 in FIG. 3. Thus, instead of tearing the sealing tabs in the vicinity of these corners 53 and 55, the sealing tabs are stretched instead by the lip 73 in the vicinity of the corners 87 and 89, as depicted in FIG. 3D, with the grooves 61 being spaced inwardly from the outermost edges of the corners 87 and 89. Thus, the invention provides a continuous unbroken sealing tab even in the vicinity of the forward corners, which is supported by a small indenting lip provided on an anvil, having a unique configuration minimizing vibration in the lip and eliminating tearing between adjacent sealing tabs of the carton. Because the lip extends diagonally away from the anvil body, the sealing tabs are sealed at a diagonal with the top end closure panel corresponding to the diagonal along which the face of the sealing lip 73 of the anvil is formed. FIG. 6 and FIG. 7 clearly show the sequence during which the sealing lip is bent from a straight configuration, as shown in FIG. 6, to a diagonal configuration in FIG. 7, corresponding to the diagonal along which the face of the lip 73 extends.

The invention has three features which prevent breakage of the continuous sealing tabs of the carton. These features are directed to the area in which the stress is a maximum amount, namely the forward corners 87 and 89 of the carton 11, as shown in FIG. 5. The first feature is the double fold of the perimeter edges to form two layers, as clearly shown in FIG. 5. Thus, the stress is at a maximum along a folded portion 93, as shown in FIG. 5, and not along an outer edge of the sealing tab. This reduces the probability of tearing in the vicinity of the corners 87, 89, because the stress occurs in a region interior of the edges of the sealing tabs. The edges of the sealing tabs are more susceptible to tearing. Thus, the double fold of applicant's invention eliminates any dependence upon the strength of the sealing tabs in the vicinity of their edges. A second feature which contributes to the continuity of the sealing tabs is clearly shown in FIG. 5 in which the length 91 of the extension of the corner 89 of the sealing tab beyond the side wall panels 15 is kept to a minimum by a proper selection of the configuration of the anvil's sealing lip 73. This eliminates the amount of stretching and strain induced in the corner regions 87 and 89. The amount of strain induced in the corner regions 87 and 89 is proportional to the distance 91 which the corners 87 and 89 of the sealing tabs 41, 39, and 43 extends beyond the adjacent side wall panel 15, as shown in FIG. 5. Thus, minimization of the extending length 91 minimizes the strain and helps to prevent tearing of the sealing tab. The third feature which helps to prevent tearing between the sealing tabs 37, 39, and 41 in the vicinity of the corners 89 and 87 is the large radii 83 provided on the sealing lip 73 in the vicinity of the corners 87 and 89. These radii 83 reduce stress in the vicinity of the corners 85 of the indentation in the sealing tabs in the carton by providing a more gradual folding of the sealing tab to form the corners 87, 89.

We claim:

1. A method of closing the top end of a carton comprising:
    forming a carton as a tube having a polygonal cross-section and a closed bottom end, said carton having plural substantially flat side panels, one of which extends above the others, to form a polygonal top end closure panel, each of said others having a top perimeter edge which extends, unbroken, through the entire width of said side panel and, unbroken, into the top edge of an adjacent side panel;
    filling said carton with a liquid;
    folding said top end closure panel with respect to said one of said flat sides to a position wherein said top panel is substantially perpendicular to each of said side panels;
    pressing the perimeter edges of said top panel and said top edges of said other side panels together to crease said perimeter and top edges into a mutually aligned, face-to-face, sealing relationship, both said perimeter and said top edges being continuous and unbroken throughout their length; and
    inducing ultrasonic energy into said perimeter and top edges to seal said end closure panel to said others of said side panels.

2. A method of closing the top end of a carton comprising:
    forming a tube having a polygonal cross-section and a closed bottom end to form a carton having plural substantially flat side panels, one of which extends above the others, to form a top end closure panel, said other side panels each including an upper portion, adjacent ones of said upper portions having common edges;
    filling said carton with liquid;
    folding said top end closure panel with respect to said one of said flat sides to a position wherein said top panel is substantially perpendicular to each of said side panels;
    folding said upper portions of said others of said side panels inwardly to be disposed within the interior of said tube without separating said common edges;
    pressing the perimeter edges of said top end closure panel against said upper portions to crease said perimeter edges of sai top end closure panel in an abutting relationship with said upper portions without separating said common edges; and
    including ultrasonic energy into said perimeter edges and said upper portions to seal said top end closure panel to said others of said side panels.

3. A method for closing the top end of a carton previously formed as a tube having a polygonal cross-section and a closed bottom end and previously filled with liquid, said carton having plural substantially flat side panels, one of which extends above the others, to form a top end closure panel, comprising:
    folding said top end closure panel with respect to said one of said flat sides to a position wherein said top panel is substantially perpendicular to each of said side panels;
    folding the top portion of some of said side panels within the interior of said tube to extend over themselves and to form an uninterrupted perimeter sealing edge adjacent said top end of said carton;
    pressing the perimeter edges of said top end closure panel against said uninterrupted perimeter sealing edge of said side panels to tightly abut said perimeter edges of said top end closure panel with said uninterrupted perimeter sealing edge; and
    inducing ultrasonic energy into said perimeter edges of said top end closure panel and said perimeter sealing edge of said side panels to generate heat along the abutment area of said perimeter edges and said perimeter sealing edge to seal said top end closure panel to said side panels.

4. A method of closing the top end of a carton as defined in claim 3 wherein said folding step folds the top edges of said side panels immediately adjacent said top end closure panel.

5. A method of closing the top end of a carton as defined in claim 3 wherein said folding step further comprises indenting the corners of said top portion of adjacent ones of said some of said side panels to reside beneath the remaining portion of said top portion and avoid tearing of said uninterrupted perimeter sealing edge.

6. A method of closing the top end of a carton comprising:
    forming a carton as a tube having a polygonal cross-section and a closed bottom end, said carton having plural substantially flat side panels which are mutually perpendicular throughout their length, one of which extends above the others, to form a top end closure panel, each of said others of said side panels having a top perimeter edge portion which extends unbroken through the width of said other side panels and unbroken into the top edge portion of an adjacent side panel;
    filling said carton with a desired material; folding said top end closure panel with respect to said one of said flat side panels to a position wherein said top panel is substantially perpendicular to each of said side panels;
    folding said top edge portion of said others of said side panels into a plane diagonal to the plane of a respective one of said others of said side panels to form an unbroken, uninterrupted sealing tab extending along each of said others of said side panels;

pressing the perimeter edges of said top end closure panel against said sealing tab to abut said perimeter edges upon said sealing tab along said diagonal plane; and inducing ultrasonic energy into said perimeter edges and said sealing tab maintaining said sealing tab stationary to produce heat sufficient to seal said edges to said sealing tab along said diagonal plane.

7. A method of closing the top end of a carton as defined in claim 6 wherein said diagonal plane is at a 45-degree angle to said top panel and said side panels.

8. A method for closing the top end of a carton comprising:

forming a carton as a tube having a polygonal cross-section and a closed bottom end, said carton having plural substantially flat side panels integral with one another at adjoining side edges, one of which extends above the others, to form a top end closure panel;

filling said carton with a desired content;

folding the top portion of some of said side panels into a plane diagonal to the plane of a respective one of said some of said side panels to form an uninterrupted sealing surface;

pressing the perimeter edges of said top panel against said uninterrupted sealing surface to position said top panel relative said side panels so that said perimeter edges abut said uninterrupted sealing surface along said diagonal plane and the remaining portion of said top panel is disposed beneath the top edge of said side panels in a plane substantially perpendicular to said side panels; and inducing ultrasonic energy into said perimeter edges of said top panel and said uninterrupted sealing surface of said some of said side panels to seal said top panel to said some of said side panels along said diagonal plane.

9. A method for closing the top end of a carton previously formed as a tube having a polygonal cross-section and a closed bottom end and previously filled with liquid, said carton having plural substantially flat side panels, one of which extends above the others, to form a top end closure panel, comprising:

folding said top end closure panel with respect to said one of said flat sides to a position wherein said top panel is substantially perpendicular to each of said side panels;

folding the top portion of some of said side panels to extend over itself and form a double thickness unbroken perimeter sealing surface upon said some of said side panels;

pressing the perimeter edges of said top panel and said double thickness unbroken perimeter sealing surface of said some of said side panels together along a plane diagonal to the plane of a respective one of said some of said side panels; and inducing ultrasonic energy into said perimeter edges of said top panel and said continuous perimeter sealing surface of said side panels to seal said top panel to said some of said side panels along said diagonal plane.

10. A method of closing the top end of a carton as defined in claim 9 wherein said top portion folding step folds said top portion of said flat side panels toward the inside of said carton.

11. A method of closing the top end of a carton as defined in claim 9 wherein during said pressing step said top portion of said side panels are stretched in one direction to have a longer dimension in that direction than they had prior to said pressing step.

12. A method of closing the top end of a carton as defined in claim 9 wherein said pressing step presses the corners of said double thickness perimeter sealing surface formed at adjoining one of said some of said side panels along a radius to relieve stress and avoid tearing of said double thickness perimeter sealing surface.

13. A method of closing the top end of a carton as defined in claim 12 wherein said top portion folding step minimizes the distance which the folded corner edge of said double thickness perimeter sealing surface extends beyond the planes of said flat side panels to relieve stress and avoid tearing said double thickness unbroken perimeter sealing surface.

* * * * *

UNITED STATES PATENT AND TRADEMARK OFFICE
CERTIFICATE OF CORRECTION

PATENT NO. : 4,292,787

DATED : October 6, 1981

INVENTOR(S) : Josef J. Buschor et al.

It is certified that error appears in the above-identified patent and that said Letters Patent is hereby corrected as shown below:

Column 12, line 8, "sai" should read -- said --.

Column 12, line 11, "including" should read -- inducing --.

Signed and Sealed this

First Day of May 1984

[SEAL]

Attest:

GERALD J. MOSSINGHOFF

Attesting Officer

Commissioner of Patents and Trademarks